United States Patent [19]

Nakagawa et al.

[11] Patent Number: 4,640,156
[45] Date of Patent: Feb. 3, 1987

[54] PRODUCTION OF SHORT METAL FIBERS

[75] Inventors: Takeo Nakagawa, Kawasaki; Kiyoshi Suzuki, Misato, both of Japan

[73] Assignees: Research Development Corp., Tokyo; Aisin Seiki Kabushiki Kaisha, Aichi, both of Japan

[21] Appl. No.: 660,559

[22] Filed: Oct. 15, 1984

Related U.S. Application Data

[63] Continuation of Ser. No. 468,277, Feb. 22, 1983, abandoned, which is a continuation of Ser. No. 199,457, Oct. 22, 1980, abandoned.

[30] Foreign Application Priority Data

Dec. 13, 1979 [JP] Japan .............................. 54-161911
Sep. 8, 1980 [JP] Japan .............................. 55-124362

[51] Int. Cl.⁴ .......................... B23B 1/00; B23B 37/00
[52] U.S. Cl. .................................... 82/1 C; 29/4.5 R; 82/DIG. 9; 144/42; 407/10; 407/114; 407/115
[58] Field of Search ........................ 407/8–10, 407/114, 115; 82/36 R, DIG. 9, 1 C, 47; 29/4.5 R, 4.5 A, 419; 75/213; 72/71; 144/42, 44

[56] References Cited

U.S. PATENT DOCUMENTS

| | | | |
|---|---|---|---|
| 1,216,484 | 2/1917 | Parker | 407/10 |
| 1,354,776 | 10/1920 | Pal | 407/9 |
| 2,776,685 | 1/1957 | Clark | 144/42 |
| 3,174,404 | 3/1965 | Findley | 82/36 R |
| 3,504,516 | 4/1970 | Sundberg | 72/203 |
| 3,701,187 | 10/1972 | Erkfritz | 407/115 |
| 3,744,353 | 7/1973 | Polts | 82/28 R |
| 3,827,119 | 8/1974 | Bennett | 407/114 |
| 4,047,469 | 9/1977 | Sakata | 408/143 |
| 4,104,900 | 8/1978 | Nels | 72/70 |

FOREIGN PATENT DOCUMENTS

| | | | |
|---|---|---|---|
| 30606 | 3/1981 | European Pat. Off. | 82/1 C |
| 525696 | 9/1921 | France | 407/10 |
| 45336 | 4/1981 | Japan | 82/2 R |
| 71736 | 5/1982 | Japan | 82/1 C |
| 118683 | 9/1958 | U.S.S.R. | 82/36 R |

Primary Examiner—Lowell A. Larson
Assistant Examiner—Jerry Kearns
Attorney, Agent, or Firm—Armstrong, Nikaido, Marmelstein & Kubovcik

[57] ABSTRACT

Short metal fibers are directly produced from a work metal block. The product fibers are very thin and short, e.g., 200 μm in diameter and 20 mm in length to the maximum. A bar like or pillar like metal bar is rotated, to which an elastic cutting tool is contacted. The entering width of cutting edge corresponds to length of fiber to be obtained. The tool is effected with fine feed and at the same time positively generated with self excited vibrations. The self excited vibration forcibly separates and divides a thin layer fiber accumulating at the cutting edge of the tool one by one without having connections in length of the fibers to each other. The process produces needle like fibers of microscopic cross sectional area. The thin and short metal fibers are produced in the same number as number of the self excited vibrations, and the fiber is right angled in axis with the cutting direction.

5 Claims, 42 Drawing Figures

FIG_3-A

FIG_3-B

FIG_3-C

FIG_5-A

FIG_5-B

FIG_6

FIG_7

FIG_8

FIG_9

FIG_10

FIG_11

FIG_12

FIG_18

FIG_19

FIG_22

FIG_23

FIG_24

FIG_25

FIG_28-A

FIG_28-B

FIG_26

FIG_27

FIG_29

FIG_30

FIG_31

FIG_32

PRODUCTION OF SHORT METAL FIBERS

This application is a continuation of application Ser. No. 468,277, filed Feb. 22, 1983, now abandoned, which is a continuation of application Ser. No. 199,457, filed Oct. 22, 1980, now abandoned.

BACKGROUND OF THE INVENTION

The present invention relates to a process of producing ultra thin and short metal fibers.

The metal fiber has variously excellent properties over a wide using range in comparison with non metallic fibers such as glass, carbon, and others, for example, high elasticity, flexibility, anti-abrasion, heat resistance, preferable conductivity of heat and electricity, or good wetted property.

The metal fibers are classified into a long fiber and a short fiber. The former is mainly used for grinding such as in a scrubbing pot cleaner or brush, and little used for the other usages. The latter is suitable for use in many kinds of composite materials such as mechanical frictional materials as a clutch or braking pad, strengthened plastic material, electrially conductive plastic material electrially conductive rubber material, electrification preventing material, or sealing material. Further, the short metal fiber is very useful for sintered porous substances such as a filter, heat pipe wig or heat exchanger, or as a metallurgical raw material, e.g., sound absorbing material, sound arresting material made by impregnating or mixing different substances in the porosities of the sintered material, or as base materials for the heat collector of the hot well or the chemical reaction catalyst.

Thus, short metal fibers are used widely as mentioned above. These are required to be less than 200 μm in diameter and less than 20 mm in length, and in addition should have the physical properties of enough tensile strength. In these circumstances, the production of such fibers is more difficult than production of non metallic fibers. Techniques of more production of such fibers has not heretofore been realized to permit mass production of short metal fibers having industrially economical excellent properties.

Nowadays, three processes have been known as manufacturing the short metal fibers, that is, I. Drawing wire and cutting process,
II. Extraction from the molten metal and
III. Making whiskers With respect to the making of whiskers (III), a process is known which ulitize metallic hair crystalline, and may produce such ultra thin and short fibers such as several microns in diameter and less than 5 mm in length. However, it is difficult to obtain homogeneity of the fibers and the production cost is more expensive than the other two processes. Further, scattering is inferior when used to the composite material. Although this process is available on a laboratory scale, it has a problem in the industrial practice.

The process of extraction from molten metal (II) makes use of a cooled disc dipped partially in the molten metal for instantaneously providing cooling and solidification which spouts or scatters the molten metal from the cooled nozzle or disc. However, due to a restriction on thickness of the product, it is not practicable to make the fibers less than 200 microns in diameter, or provide ones of excellent strength.

For those actual problems, the drawing-cutting process (I) has broadly been employed. This process comprises rolling the cast ingot and producing the wire material, repeatedly passing the wire through many dies of various hole diameters, and finally subjecting the wire to a post-process of the cutter mill. This is, as seen, inferior in the production and very high in the production cost. Since the product is circular in cross section and has a smooth surface, the adherence is not preferable when compounded with other materials. Additionally, the porosity is not satisfied when the fibers are gathered.

The present inventors proposed a cutting process of manufacturing the short metal fibers, in which a plain milling cutter directly applies to a flat work metal block, and the production cost is low because of the work material of low process extent. However, since the rotating cutting edge is urged to the material while the milling cutter and the material are moved relatively for carrying out multi-cutting, the producing conditions are severe, and the size or shape of the fiber or the physical properties are changed by disorderings such as vibration of a main shaft of the machine, clearance between an arbor and an inner diameter of the cutter, or minute error on precision as vibration of an outer circumference of the cutting edge. Although it is possible to manufacture thick fibers up to 0.5 to 0.8 mm in diameter and 25 to 50 mm in length for reinforcing the structural concrete, the ultra thin and short fibers cannot be produced as less than 200 microms in diameter, e.g., 5 microns to the minimum even if the machine or tool are finished with the super precision and imparted with the high rigidity, and the obtained fibers are broad in dispersion in the various characteristics. Further, there are also problems in the production due to the on-and-off processing by the tool having the equidistant cutting edges on the outer circumference thereof. In these circumstances, satisfied ultra thin and short fibers have never been produced in mass at the low cost in dependence upon this process.

OBJECT OF THE INVENTION

The present invention is to eliminate disadvantages as said involved with the prior art. It is a primary object of the invention to provide a process which may industrially produce at low cost and high efficiency short metal fibers having diameter of less than 200 μm to about 5 μm and length of less than 20 mm, and having excellent characteristics of strength, adhering to others and scatterings among fibers.

It is another object of the invention to provide a process which may exactly produce the short metal fibers having the foregoing characteristics from various sorts of metals, irrespectively of high or low rigidity, without being restricted with respect to the properties of the raw materials.

It is a further object of the invention to provide a process which may mass-produce this kind of short metal fibers having microscopic diameter in the absolute size and length of less than 3 mm to about 0.2 mm at the high efficiency with little dispersion of properties.

It is a still further object of the invention to provide a tool suitable to the production of the short metal fibers.

BRIEF DESCRIPTION OF THE INVENTION

For attaining the above mentioned objects, the present invention employs a technique which directly produces the short fibers from the bar-like or pillar-like work metal block by turning or lathing the block on the surface with a cutting tool while rotating the metal block.

The production by the cutting process is obvious per se as seen in making a steel wool for the scrubbing pot cleaner or brush. However, this production depends upon combining thin wires in endless circle, rotating the circled wire, applying a cutting tool having comb like cutting edges to the wire at its surface, and cutting out thinner fibers. Therefore, the obtained fiber is a curled long one. For making it short, the fiber should be cut with the cutter mill to turn out a chopped wool, resulting in increasing the steps. The dispersion is large in the fiber length. Besides, since an axial line of the fiber runs along the cutting direction, the fiber is formed with rugged wrinkles traverse with the fiber axis, which serve as notches to decrease the strength. When manufacturing thin fibers and since a point-contact is defined between the cutting edge and the block metal, the point-contact is subject to pitching and the cutting edge is extreme in abrasion. For those problems, the metal block is limited to the soft steel, stainless steel or the like. Therefore, the present invention not only turns the bar-like or pillar-like work material by lathe but also adopts the turning condition that the axial direction of a fiber is right angled with the turning direction. That is, the cutting edge of the tool is determined on the surface of the work material to be rotated in the cut corresponding to length of fiber to be produced. The tool is effected with fine feed in direction parallel or traverse with the axial line of the metal block. In such a manner, it is possible to obtain the short metal fiber having length corresponding to the entering cut, the fiber axis of which is right angled with the cutting direction, and having the strength as or more than the mother material.

However, in this process, a thin layer from the metal block is accumulated on a rake face of the cutting edge by the rotation of the metal block and the feed given to the cutting edge, and when the accumulation reaches up to a certain extent, the layer on the rake surface is separated in division by utilizing spontaneous cracking. Accordingly, the properties of the fibers are limited to low rigidity, and it is not possible to obtain the fiber which is thinner than a certain limit. Further the dispersion is large.

Passing through many investigations to solve those difficulties, the present invention positively generates and utilizes self excited vibrations of the tool as a means to exactly obtain the fine fibers. The self excited vibration is a phenomenon regarded as harmful in the general cutting process, since it brings about ruggedness on the surface and deterioration to the size or precision of the product, and it creates pitchings. Therefore, it has a problem in the cutting technique how to control this phenomenon.

The present invention contravenes the conventional technical practice and positively generates the self excited vibrations in the tool to periodically dislocate the tool contacting the metal block, away from the block so that the metal thin layer being gathered is forcibly sheared to divisionally produce the thin and short metal fibers of determined size.

That is to say, in the process of directly cutting the bar-like and pillar-like work metal block to manufacture the short fiber which is, in the axial line, traverse with the cutting direction, the present invention is characterized by giving fine feed to the tool contacting the metal block with its cutting edge while, at the same time, positively generating the self excited vibration in the tool, thereby to periodically dislocate the cutting edge away from the block, and forcibly shear the work material and finely divide the fibers to continuously turn out the products.

By this process, it is possible to provide the mass production of the fibers which are as thin in diameter as less than 100 microns to the minimum of 5 to 10 microns and are satisfactory in strength and further are large in surface area. The work material is not limited, and the fiber having the above mentioned characteristics may be produced from various kinds of the metals including ones of high rigidity. Since the ultra thin and short fibers are produced in the same number as number of the self excited vibrations, the productivity is high. The apparatus including the tool is simple in structure with the result of economical production cost.

Other objects and the structure of the invention will be apparent from the following description in reference to the preferred embodiments shown in the attached drawings.

DETAILED DESCRIPTION OF THE INVENTION

Reference will be made to embodiments of the invention.

Figure 1:
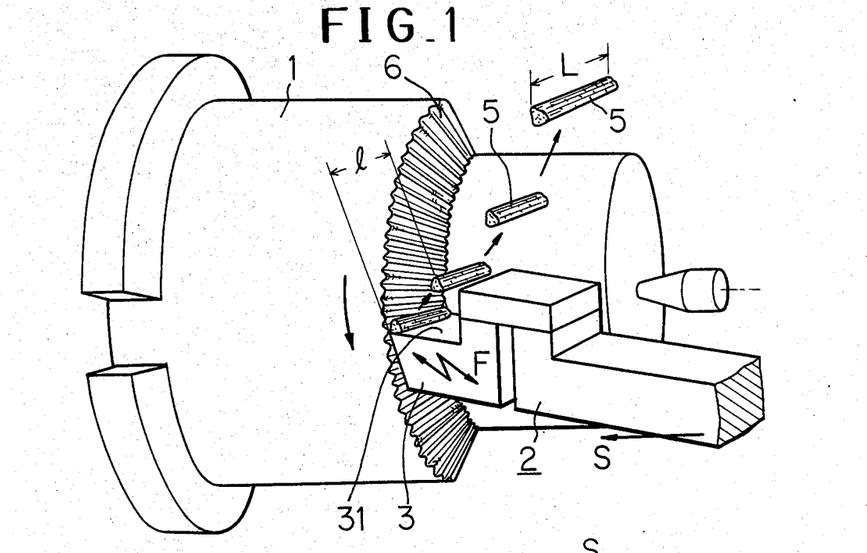
FIG. 1 is a perspective view showing a basic embodiment of producing the ultra thin and short metal fibers according to the present invention.
Figure 2:
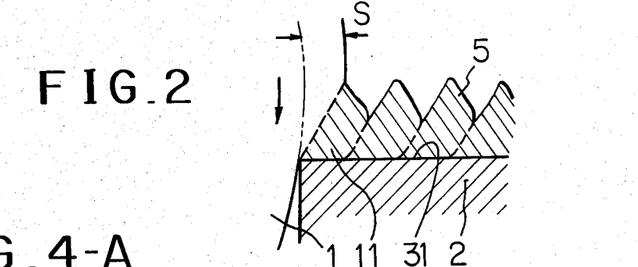
FIG. 2 is a cross sectional view showing a production of fiber not depending on the present invention, FIGS. 3-A to 3-C are principle views showing a production according to the present invention, FIGS. 4-A and 4-B are models of the short fibers by the invention, in which FIG. 4-A is an explanatory view showing movement of a cutting edge at the self excited vibration, and a cutting situation, and FIG. 4-B is an explanatory view showing relationship between the fiber production and phase lag, FIGS. 5-A and 5-B are cross sectional views showing relationships between movement of a cut layer and fiber generation by by the invention.

FIG. 1 shows a basic technique of producing the short metal fibers according to the invention, in which the reference numeral 1 is a bar like or pillar like work metal block. For the production, the block 1 is secured on the surface by means of a chuck or the like and is rotated at determined speed, and a cutting edge 3 of a tool 2 is applied to the block 1 on the surface. It is at this time, necessary that the cutting edge 3 should have an entering cut corresponding to length of fiber to be produced, and fine feed (S) is given to the cutting edge 3 in a direction parallel to the axis of the work material or a direction transverse therewith. The work material 1 is turned by lathe on its surface by the linear fine feed (S), thereby to continuously create the short fibers 5, the axial line of which is right angled with the cutting direction. In FIG. 1, the depth of cut corresponds to the length (L) of the fiber. If the feed (S) is transverse with the axial line of the metal block, the width of cut is the length (L) of the fiber.

Transverse feed with the axial line of the block has drawbacks in changing of the cutting speed or causing of flexion due to local thinning of the work material, since the cutting edge 3 goes toward the center of the block, and the embodiment in FIG. 1 is in general advantageous.

In the above embodiment, the thin layer 11 from the metal block is accumulated on the rake face 31 of the cutting edge 3 in accompany with the rotation of the block 1 and the feed (S) of the tool 2. When the accumulation reaches a certain amount, the accumulating layer is cracked due to unstabilization, thereby separating in division the fibers 5 having the length (L) corresponding to the depth (1) of the entering cut. However, since this divisional separation only depends upon the spontaneous cracking in response to the physical characteristics of the work metal, it is not always sure. If the raw material had low ductility such as brass, it would not matter, but if it had high ductility such as soft steel, stainless steel, aluminum or Al alloy, pure copper, titanium and others, the fiber would be easily connected entirely or partially with adjacent ones. Otherwise, unless it accumulated more than a certain amount there would be no crack, and the fiber to be obtained is limited in thickness so that an ultra thin one cannot be realized, and the dispersion of the fiber thickness is broad.

In view of these circumstances, the present invention not only contacts the cutting edge 3 to the rotating metal block 1 while giving the linear feed (S) thereto, but also positively generates, in the course of the process, the self excited vibration (F) in the tool 2 as shown with an arrow in FIG. 1 so that the accumulating layer from the block on the rake face 31 is forcibly sheared and separated by the periodical dislocation of the cutting edge 3 with respect to the metal block 1 owing to the self excited vibrations (F).

Figure 3:
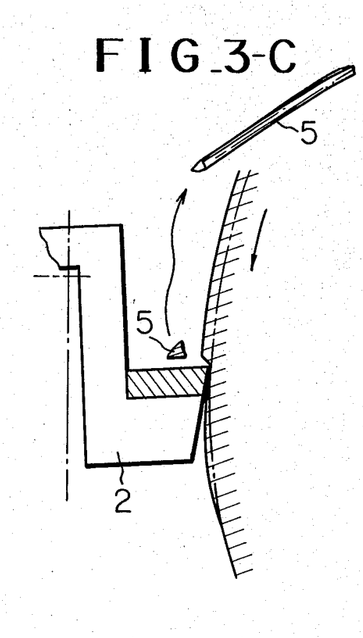
Figure 4:
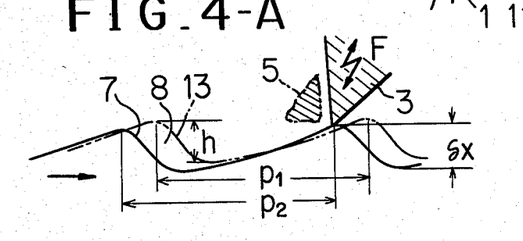
Figure 5:
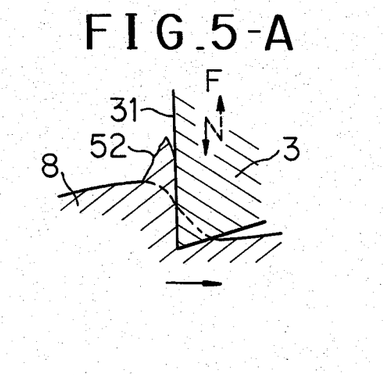

FIGS. 3 to 5 show mechanisms of producing the short fibers according to the present invention. FIGS. 3-A to 3-C illustrate beginning conditions of the production. The thin layer 11 accumulates by the feed (S) on the rake face 31 of the cutting edge 3 from a smooth surface of the work metal 1. By causing, at this time, the self excited vibrations (F) in the tool 2 the cutting edge 3 dislocates, as shown in FIG. 3-B, toward opposition to the surface 12 of the block 1. A cutting margin is thereby made zero and at the same time the layer 11 on the rake face 31 is forcibly generated with cracks 4 by the dislocation of the cutting edge 3. Subsequently, when the dislocation reaches up to a certain amount and the cutting edge 3 returns to the block surface by reactive force, the layer is instantaneously sheared and separated at the cracked part to issue it from the rake face 31 as the fiber 5 of the minute cross sectional area having the length (L) corresponding to the entering cut depth.

The dislocation of the cutting edge 3 takes place during one rotation of the metal block so that the block 1 is formed on it surface with continuous wave like chattering marks (see FIG. 1). As a result, vibration energy is supplied to the tool per each of the vibrations (F), and the cutting edge 3 continuously makes vibrations (F) and cuts convexes or raised portions of the chattering face as shown in FIG. 4. Thus, needle like short fibers are produced with regular thickness but without having connection at the side thereof. In other words, the chattering mark 6 is not a sine wave but it has a sharp rising at one part like a saw edge or an old fashioned wash-scrubbing board.

As shown in FIG. 4-A, the chattering mark 6 has a ruggedness (h) larger than the feed (S), and the tool cutting edge 3 vibrates at amplitude ($\delta x$) almost equal to the value of the ruggedness (h). There is a lag between the preceding wave (i.e., before one rotation) of the turned surface and the vibration (F) of the tool. ($p_1$)($p_2$) designate pitches of the chattering marks and are nearly equal to a pitch ($\delta y$) of the self excited vibration (F). The arrow shows the cutting directions. By the rotation of the block 1 and the feed of the tool 2, the cutting edge 3 comes to the block along the slope of the chattering mark of the preceding cut surface 13 as a cutting locus 7 in FIG. 4-A, and the edge 3 enters the convex 8 and retreats in the feed force direction to shape a fiber and separates from the convex 8 at separating. Such actions are repeated and the chattering mark moves in succession, while the short fiber is made per each cycle of the self excited vibrations (F). That is, the operation repeats at high speed the process that the cutting edge 3 collides and separates with respect to the block surface, i.e., the chattering marks 6, and continuously forms the ultra thin and short fibers of the same number as the number of the vibrations (F).

Thus, the vibrating embodiment necessarily has characteristics as follows.

a. The cutting edge is dislocated in the feed force direction, b. The amplitude ($\delta x$) of vibration (F) is larger than the feed (S) of the tool, c. The end point of the cutting edge is non-contacting to the block per one cycle of the vibration (F), d. The cutting loci are equal in n times and n+1 times of cutting, and e. The vibration (F) has the determined vibration number (fn) in accordance with the fiber size.

Figure 6:
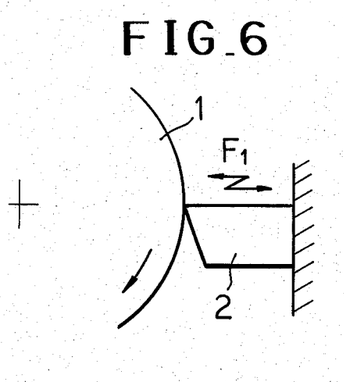
FIGS. 6 and 7 are cross sectional views showing the self excited vibration to be applied to the present invention.
Figure 7:
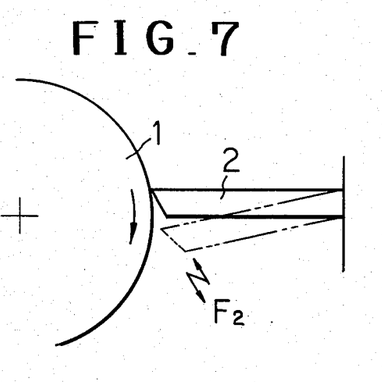

Herein, the elements (a) and (b) are the necessary conditions for exactly producing the ultra thin and short fiber per one cycle. However, the above mentioned condition also include a case that the wave length of the chattering mark coincides with the wave length of vibrations (F) of the cutting edge. Accordingly, it is necessary in the condition (c) that the chattering mark diverges from the wave length of the vibrations (F) and the cutting edge contacts and separates from the block surface per each cycle. The vibrating direction of the condition (a) of course means a case that the vibration (F) is completely composed of only the dislocation in the feed force direction as shown in FIG. 6, and includes a case that the dislocation is in the feed force direction including a component in the principle cutting force as shown in FIG. 7.

The condition (d) is necessary for obtaining uniformity of the fiber in shape and size. When the locus of the cutting edge is different between one rotation of the metal block and a coming one rotation, the dispersion occurs on thickness and shape of the fiber. The vibration number (fn) of the condition (e) is, as said later, relative with the fiber thickness, and concurrently directs to the producing number of the fibers.

The vibration number should be by far higher than at least the natural vibration number of the producing apparatuses such as the work metal block, chuck, turning table, column or the cutting edge bed. If the vibration number (fn) were the same as the natural vibration number, resonance phenomena would occur and the production itself would encounters obstacles. In experiments by the inventors the desired short fibers were obtained by the vibration within the range of 1 to 7 KHz.

As a means of generating the vibrations of the above mentioned conditions (a) and (e), it may be assumed to give externally the forcible vibration to the tool by means of an electrical-hydraulic system, mechanical-hydraulic system, mechanical or supersonic system. However, since those external power sources require special measures, the practice is complicated so much and the cost becomes inevitably higher, and the tool is deteriorated in the durability. In addition, depending upon such systems, the conditions (b), (c) and (d) are very difficult to be satisfied.

The present invention employs such a tool having the high natural vibration number and adopts a technique generating the self excited vibration (F) in the tool itself. According to this method, the conditions (a) to (e) may be easily and adequately satisfied. In comparison with the external power source, the practice and the structure of the apparatus can be simplified.

Figure 8:
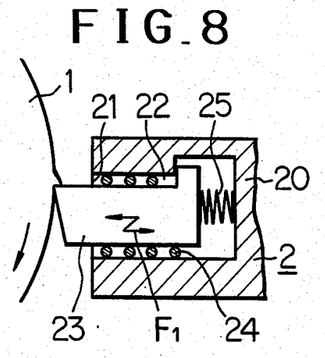
FIGS. 8 and 9 are cross sectional views showing basic examples of tools to be employed in the invention.
Figure 9:
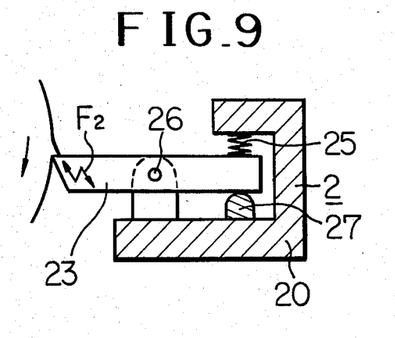

In this instance, the natural vibration number coincides with the self excited vibration. Those are factors to influence the productivity and the fiber thickness. If the natural vibration number is high, the productivity can be increased as well as the fiber thickness can be made thin. For heightening the natural vibration number it is appropriate to make the rigidity low and impart the elasticity to the work material. FIGS. 8 and 9 denote the basic embodiments of the self excited vibration tool according to the invention.

FIG. 8 shows a vibrating tool of the feed force direction shown in FIG. 6, where the tool body 20 is defined with a window 21 and a communicating space 22. A cutting edge 23 is movably disposed on rolls 24 within the space 22 and is supported at its back by a spring 25 having a determined spring constant. FIG. 9 illustrates a vibrating tool of the feed force direction shown in FIG. 7, where a cutting edge 23 is supported at its center with a pivot 26 and at its back with a spring 25 and a stopper 27.

Figure 10:
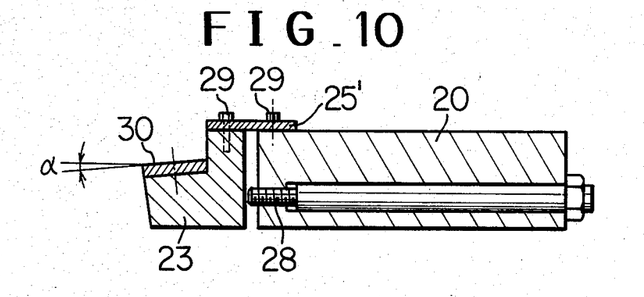
FIGS. 10 and 11 are cross sectional views showing other embodiments of elastic tools in the invention.

FIGS. 10 to 12 show the actual embodiments in FIG. 7. In FIG. 10, the tool is composed of a main body (holder) 20 secured to a cutting edge fixture and a cutting edge 23 of L shape in side view having a space with respect to the holder 20. A cutting tip 30 is detachably fixed to the cutting edge 23 which is connected with the tool 20 via a plate spring 25' of the self excited vibration (F). The tool 20 is projected with a stopper 28 for controlling dislocation, the projecting amount of which controls the dislocating amount at the self excited vibration (F). For changing the number of the vibration (F), it is sufficient to exchange with another plate spring of different thickness by removing stoppers 29.

Figure 11:
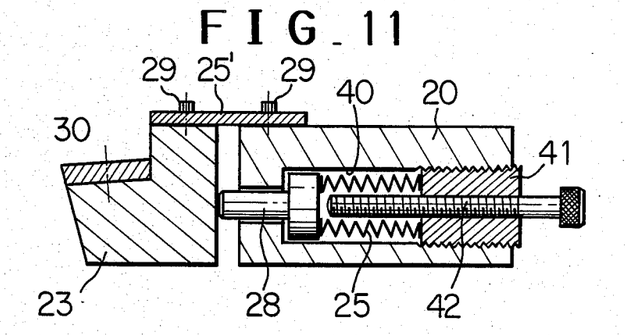

FIG. 11 is a further improvement of the tool in FIG. 10. The tool 20 is formed with an axial hole 40 into which a stopper 28 is movably disposed, and the axial hole 40 is screwed at its rear with a plug 41 into which a stopper bolt 42 is inserted to contact the rear of the stopper 28. Further, a spring 25 is interposed between the stopper 28 and the plug 41 within the axial hole 40, thereby biasing the stopper 28. According to this structure, the force of the spring 28 is changed by controlling the plug 41 forward or backward, and it is no longer necessary change the spring 25 for providing the wide vibration number.

Figure 12:
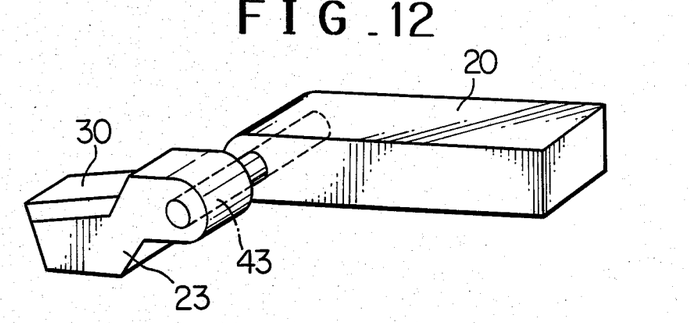
FIG. 12 is a cross sectional view showing an embodiment of an elastic tool for another practice.

FIGS. 10 and 11 both show that the cutting edge 23 and the tool 20 are arranged in series, and of course those members may be connected traversely via the spring plate. In this instance, the stopper and others are arranged in width. FIG. 12 shows that the cutting edge 23 and the tool 20 are connected with a torsion bar 43, where the self excited vibration (F) is effected by utilizing twist and dynamic stability of the bar 43.

With respect to the self excited vibration, it is preferable that the tool has characteristics of creating no fatigue destruction during manufacturing the fibers and controlling the natural vibration number and the spring constant in response to the properties of the raw material. For these points it is desirable that the tool is, as shown in FIGS. 10 and 11, composed of the cutting edge having a tip fixture, a main body substantially independent of the cutting edge and a member combining the both.

Figure 13:
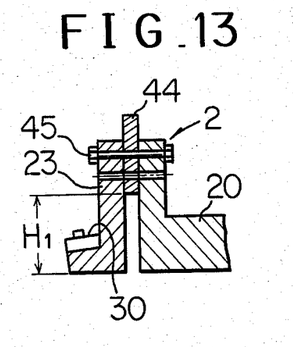
FIGS. 13 to 15 are cross sectional views showing modifications of the tool in FIG. 10, FIGS. 16 and 17 are a cross sectional view and a plan view partially in section, showing a modification of the tool in FIG. 11.
Figure 14:
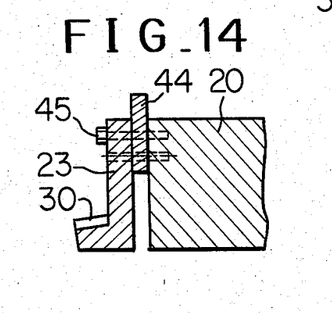
Figure 15:
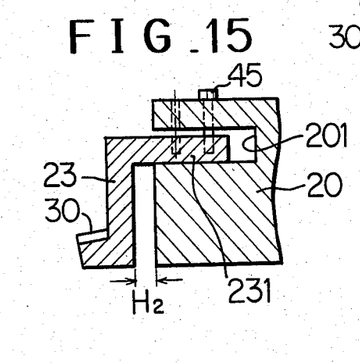

FIGS. 13 to 15 show modifications of FIG. 10. FIGS. 13 and 14 illustrate that an L shaped cutting edge 23 having a detachable cutting tip 30 is connected with the main body (i.e., holder) 20 via a spacer 44 by bolts 45, 45. FIG. 15 illustrates that a cutting edge 23 is composed in Z shape, and a horizontal arm 231 is inserted in a groove 201 of the holder 20 and is fixed by a bolt 45. Preparing such divided type tool, it is not necessary to exchange the main parts, and since the size of an arm length H1 or H2 of the tool may be changed by controlling the spacer 44 or the cutting edge 23, the natural vibration and the spring constant can be controlled within a certain range.

Figure 16:
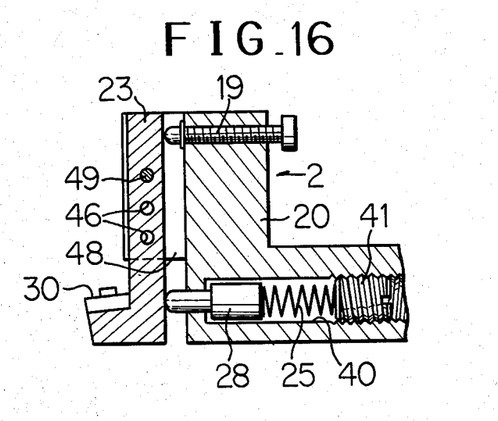
Figure 17:
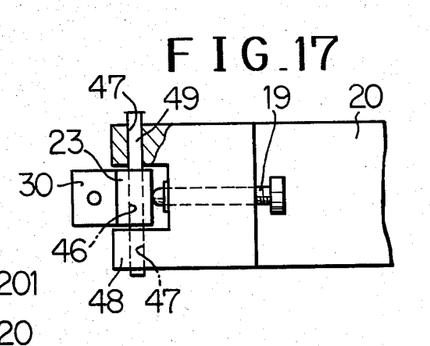

FIGS. 16 and 17 show a tool having more preferable characteristics by further applying the tool in FIG. 11. The cutting edge 23 is formed with a lateral hole 46 at the center in height on one hand, while the holder 20 is provided with a fork 48 having a plurality of passing holes 47, 47 on the other hand. The fork 48 holds the cutting edge 23 therebetween by passing a pin 49 through the lateral hole 46 and the holes 47, 47, thereby to connect the cutting edge 23 and the holder 20. Further the holder 20 is formed at its lower portion with an axial hole 40 as seen in FIG. 11 into which incorporated are a pushing member 28 contacting the rear of the cutting edge, a spring 25 and a regulator 41. The holder 20 is provided with a positioning bolt 19 at its upper portion to contact the rear side of the cutting edge 23.

Depending upon such a hinge type tool, a pin 49 is inserted into the optional hole 46 and the lateral holes 47, 47, thereby enabling change of the distance from a fulcrum and change of the pre-pressure of the spring 25 by rotation of the regulator 41, so that the spring constant and the natural vibration number can be easily regulated to meet the properties of the work material. In such a way, the vibration number as high as 6 KHz can be set. Since the cutting edge 23 is tilted around the fulcrum of the pin 49 by the positioning bolt 19, a rake angle ($\alpha$) can be controlled by moving the bolt 19. Therefore, the producing range of the desired fibers may be widely enlarged by relying on this tool structure, and especially the cutting speed can be increased.

For producing the ultra thin and short fibers according to the present invention, at the same time as setting the above mentioned vibrating conditions, it is appropriate to provide such conditions as follows:

a. The cutting speed (V) is selected within the determined range in accordance with the properties of the work material, and at the same time the feed (S) is made fine within said range, and b. The rake angle ($\alpha$) of the cutting edge is set from the ambient 0 degree to the negative angle.

The reason why the relation between the cutting speed (V) and the feed (S) is specified, is because it is preferable that the cutting speed (V) is high to some extent while the feed (S) is low. The other reason is why the cross sectional area (A) of the fiber by the invention is approximately $A = (1000 \cdot V \cdot S)/(60 \cdot fn) = \pi d^2/4$ where "fn" is the self excited vibration number and "d" is the diameter, and under a condition that the self excited vibration frequency is constant the fiber can be made thin by decreasing the cutting speed (V) and the feed (S). If the cutting speed (V) could not be lowered so much for the productivity or other reasons, the desired productivity and fiber size could be accomplished concurrently by making the feed (S) low as well as making the self excited vibration number (fn) high. Since the substantial cut is rather large, in comparison with the feed, owing to the dislocation of the cutting edge by the vibration, the cutting is well satisfied even with the fine feed.

FIGS. 18 to 21 illustrate the relations between the cross sectional area of the fiber and the producing condition when making the fibers from the bronze bar of 60$\phi$ in diameter by means of the tool shown in FIG. 10 under 2.2 KHz constant self excited vibration, 5° rake angle and 5 mm cut depth.

Figure 18:
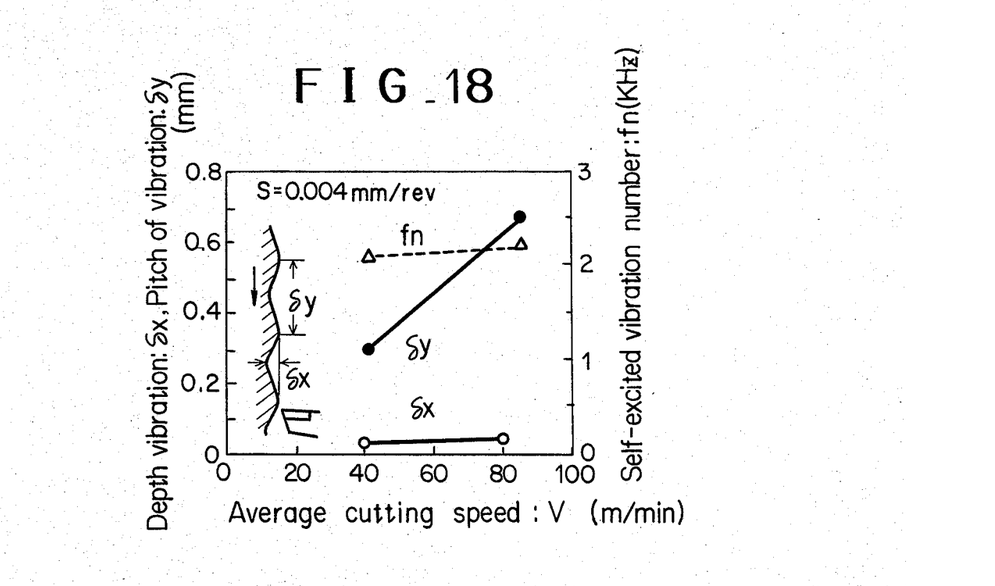
FIG. 18 is a graph showing relationship between cutting speed and self excited vibration in the invention.
Figure 19:
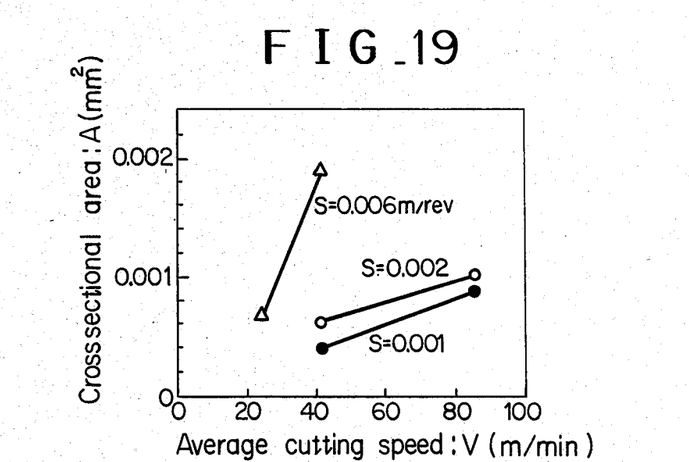
FIG. 19 is a graph showing relationship between cutting speed and fiber cross sectional area.

FIGS. 18 and 19 show the relation between the cutting speed (V) and the fiber cross sectional area, from which it will be seen that the cross sectional area is increased by heightening the cutting speed. The reason therefor would be assumed that even if the cutting speed is changed but since the frequency (fn) of the self excited vibration (F) is constant, the pitch ($\delta y$) of the self excited vibration (F) increases in proportion to the cutting speed, and the fiber cross-sectional area (A) is proportional to the product of the speed (S) and the self excited vibration pitch ($A = a \times S \times \delta y$, herein "a" is constant).

Figure 20:
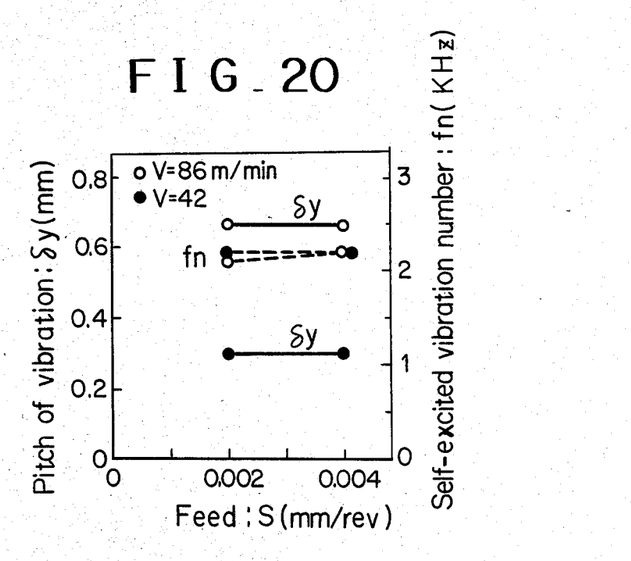
FIG. 20 is a graph showing relationship between feed and self excited vibration.
Figure 21:
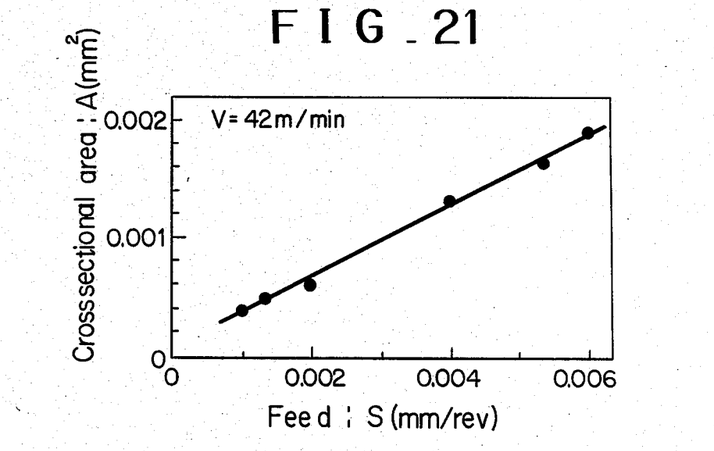
FIG. 21 is a graph showing relationship between feed and fiber cross sectional area.

FIGS. 20 and 21 show the relation between the feed (S) and the cross sectional area, from which it will be seen that the fiber cross sectional area increases in linear line by heightening the the cross sectional area, since the feed (S) does not impart influence to the pitch ($\delta y$) of the self excited vibration (F).

From the above mentioned facts, the ultra thin and short fiber of the destined size can be manufactured by appropriately selecting the cutting speed (V) and the feed (S) within the range e.g., 20 to 400 m/min in the former and e.g., 0.001 to 0.02 mm/rev in the latter, and adjusting the self excited vibration number (fn) e.g., 1 to 7 KHz. The fiber thickness may be changed within the narrow range by regulating the cutting feed (V) and the feed (S) and the fiber thickness can be widely changed by changing the self excited vibration number (fn).

The reason why the rake angle ($\alpha$) is specified as the condition (b), is because if the rake angle ($\alpha$) is enlarged positively, the self excited vibration (F) is difficult and the pitching is easy, and if the rake angle ($\alpha$) is made 0° or near, the self excited vibration (F) is easy over the broad cutting speed and the pitching can be avoided, and further when the cutting edge moves with respective to the work block, the cutting oil is easy to penetrate and the abrasion is difficult to be effected.

As mentioned above, the basic manner of the invention is to directly produce the short fibers from the work metal block by the turning lathe operation, and is characterized by positively providing the self excited vibration (F) to the tool in the course of the process. Since the thin layer from the metal block is forcibly separated in division, the fibers of 5 $\mu$m in converted diameter do not connect with others and are needle-like perfectly separate. The fiber of the desired thickness may be obtained from almost all of the metals, of course Cu-alloy such as brass or German silver, various kinds of steels, pure copper, aluminium and Al-alloy.

The obtained short fiber is right angled with the cutting direction and it has very little defects on the surface with strength as or more than the mother material owing to the work hardening and lowering toughness. Furthermore the fiber has, as in FIGS. 5-A and 5-B, a smooth and bright face 51 which contacted the rake surface 31 and a rugged face 52 which was axially formed on cutting free surface and destroyed rough face 53 which was made at rupture and separation. Accordingly, the surface area is very large and has the excellent adherence to other materials. When employing as the sintered porous raw material, the porosity may be improved since the observable density can be made low.

The cross sectional shape of the fiber can be arbitrarily made from mountain to crescent by utilizing the fact that the cut length is changed by controlling the cutting speed.

The short metal fiber has an inclination that the fiber is easy to intertwine when it has an aspect ratio more than a certain extent. The usage requires the fiber to have the ultra thin diameter in the absolute size and the short length (L). For satisfying this requirement by the foregoing process the cut (1) is made little, but since this manner makes the rigidity of the cutting edge high owing to shortage of the cutting resistance force, the self excited vibration (F) is difficult, so that the fiber diameter is made large with a result of decreasing the productivity.

Figure 22:
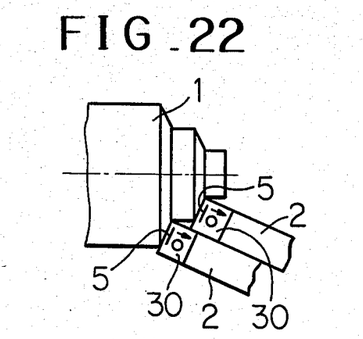
FIGS. 22 to 25 are plan views showing embodiments of mass producing tools.
Figure 23:
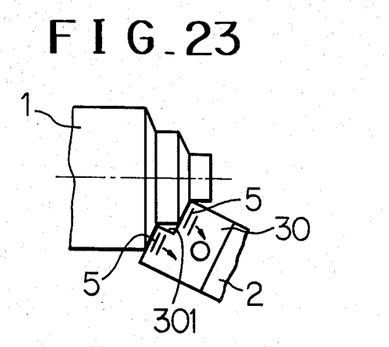
Figure 24:
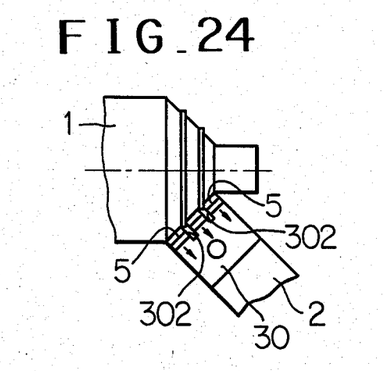

FIGS. 22 to 25 show the tools and manners for satisfying the request. In FIG. 22, a plurality of elastic tools 2, 2 having the cutting edges of narrow width are stepwisely arranged in parallel (parallel tip). In FIG. 23, the tips 30 are formed with a step 30, the tip composing the cutting edge by the electrospark machining (stepped tip). In FIG. 24, the tip 30 is formed with slits 302 at determined distance by the wire cut (slitted tip) in place of the step. As is seen, the cutting edge is substantially divided into a plurality of tips in width, and if attaching such embodiments to the cutting edge 23 in FIGS. 10 to 17, the self excited vibration (F) can be served while keeping the determined cutting resistance, and it is possible to simultaneously mass-produce the thin and short fibers which are 1/several of cut depth (l) in FIG. 1. Accordingly, the productivity per time can be heightened.

Figure 25:
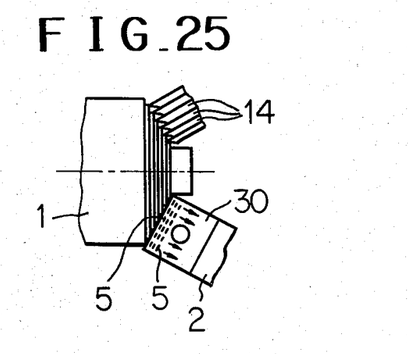

FIG. 25 is a technique which uses the tool 2 furnishing as a tip 30 the ordinary one, where a plurality of knife edge 14 are contacted to the work block 1 in opposite to the tool 2, and the knife edges draw slits on the block surface 1 in order to divide the length of the fiber.

Since this method in FIG. 25 produces a lot of short fibers corresponding to the spaces between the slits in length, it may make very short fibers in comparison with the methods in FIGS. 22 to 24. However the thickness of each of the knife edges 14 is limited owing to the strength and other factors, and it is difficult to produce the fiber of the length less than 2 mm, especially less than 1 mm.

Figure 26:
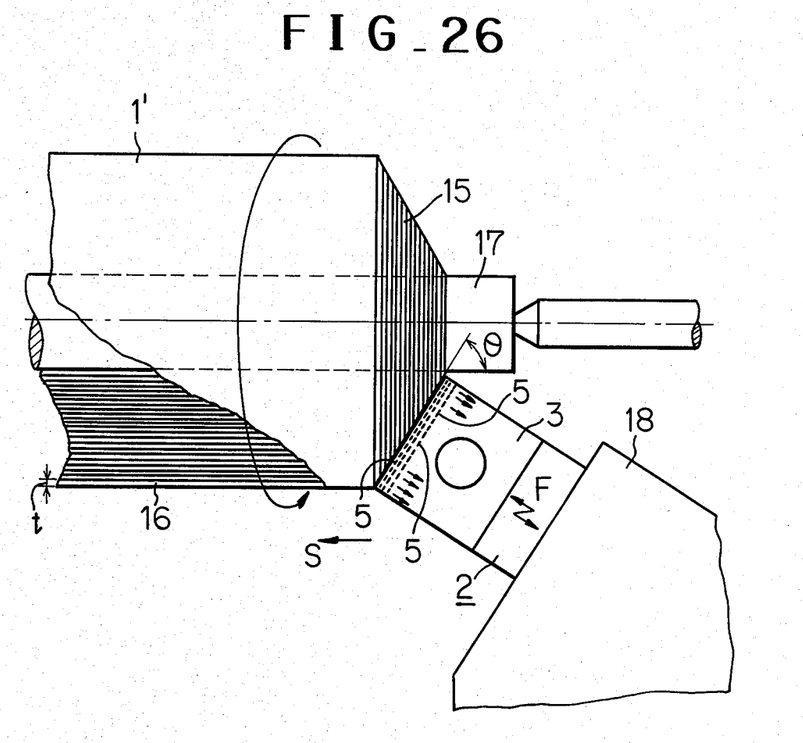
FIG. 26 is a plan view, partially in section, showing an outline of the fiber production according to the present invention.
Figure 27:
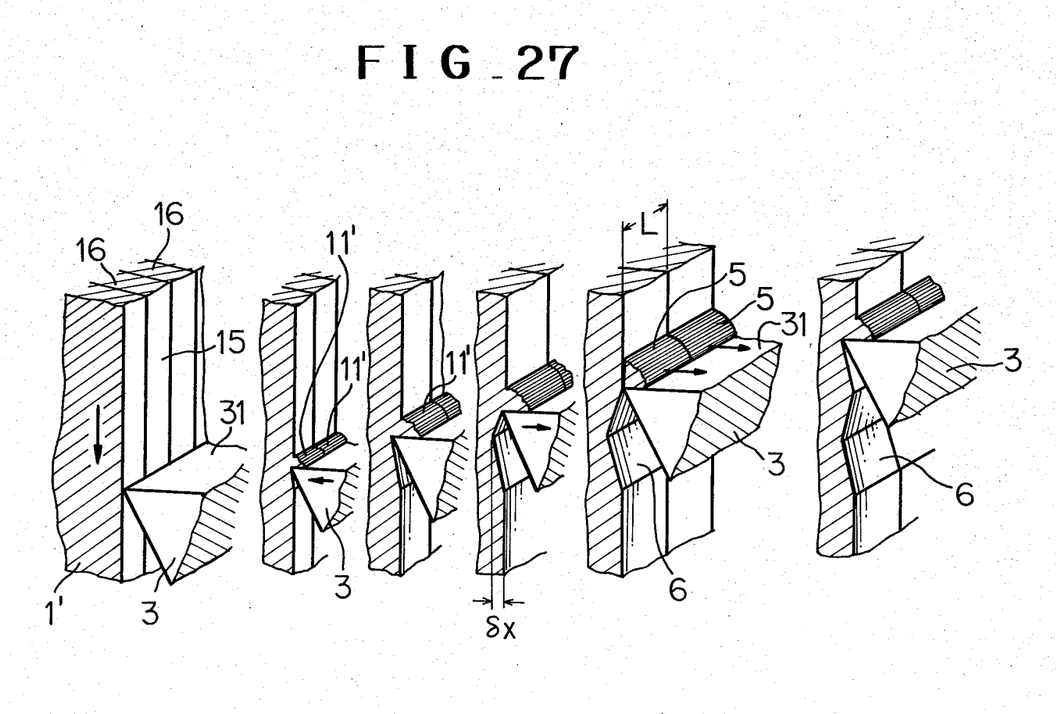
FIG. 27 is principle views showing processes by the method in FIG. 26, FIGS. 28-A and 28-B are explanatory views showing other manners of fiber uniform properties by the invention.

FIGS. 26 and 27 illustrate methods for producing easily and efficiently the fibers of shorter length and thinner diameter than the above method. In regard to contacting of the cutting edge to the bar-like or pillar-like rotating work material, giving the fine feed to as well as generating the self excited vibrations (F) in the tool, and forcibly separating in division the fibers from the block surface, the instant methods are the same as mentioned above. However, in FIG. 1 and FIGS. 22 to 25, the work block of raw material is solid in center, while the method in FIG. 26 uses especially a coil material as the metal block 1', and the superimposed edge 15 of the coil 1' is subjected to the turning operation by the tool 2.

The coil 1' is a thin sheet 16 made by rolling the metal of the properties in accordance with the fiber to be obtained and coiling it in multi-layer, and the thickness (t) is appropriately determined in view of fiber length. Coiling should be tight. The thin sheet may be coiled from beginning, and a core metal 17 is, as shown, laid around which the sheet may be coiled.

While the coil 1' is rotated, the cutting edge 3 is contacted to the edge 15 thereof, and the determined fine feed (S) is supplied to the tool 2 in the axial direction of the coil via a cutting bed 18 at the set cutting (l), and at the same time the tool 2 is positively generated with the self excited vibration (F).

In such a way, the cutting edge 3 advances in the feed force direction and contacts the edge 15 in parallel to rotation of the coil 1' in an arrow and when reaching the predetermined depth ($\delta x$), it retreats in the feed force direction. The cut layer 11' accumulated on the rake face 31 of the cutting edge 3 is sheared into the fiber 5 and the tool 2 again advances. Since the cut face is the superimposed layer of the thin sheets 16, 16, the cut layer is separated per thickness of the sheet uniformly. The fibers are produced in parallel from the overall width of the cutting edge corresponding to the depth (l) of cut at high efficiency.

Figure 28:
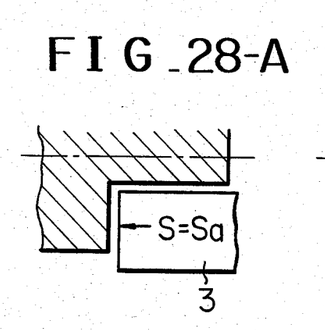

According to the methods in FIGS. 1 and 26, it is possible to mass-produce the ultra thin and short fibers, and in order to more heighten the productivity, it is sufficient to enlarge the width of the cutting edge or prepare a plurality of the tools, and subject to the turning by the self excited vibration. However, in this case, since the cutting width is enlarged, there occurs a large difference in the cutting speed between the inside and the outside of the cutting edge, resulting in dispersion of the fiber diameter. For a countermeasure, the cutting edge of the tool 2 is not right angle ($\theta=90°$) with respect to the axial line of the work block as shown in FIG. 28-A, but is made oblique at an appropriate entering angle (e.g., 30°) as shown in FIG. 28-B, and under this condition, the tool is fed in the axial direction of the work block.

According to this manner, the cutting speed of the inside and the outside of the cutting edge is made nearly equal, and it is possible to enlarge the cutting width and heighten the productivity with little dispersion of the fiber thickness. Since the substantial feed is made small ($Sa = S \cdot \sin \theta$) in comparison with the $\theta = 90°$ system (FIG. 28-A), there is no problem if the feed is made large as much, the feed being $Sa/\sin \theta$.

Figures 29, 30:
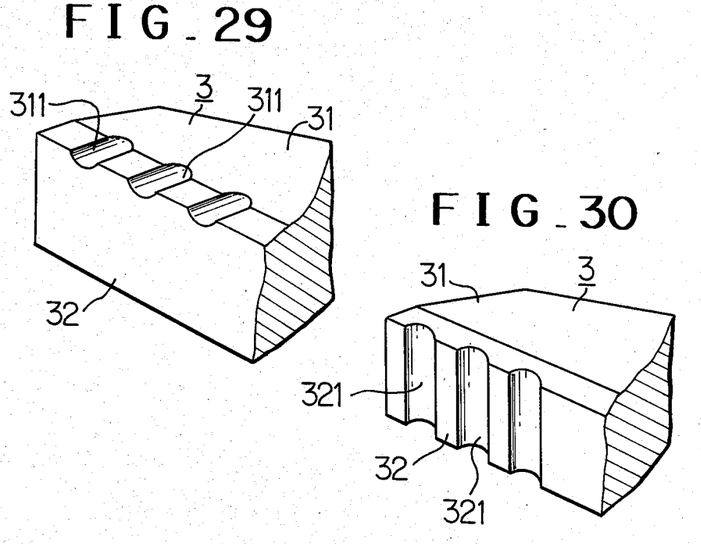
FIGS. 29 to 31 are perspective views showing tools for producing fibers of different shapes according to the invention.
Figure 31:
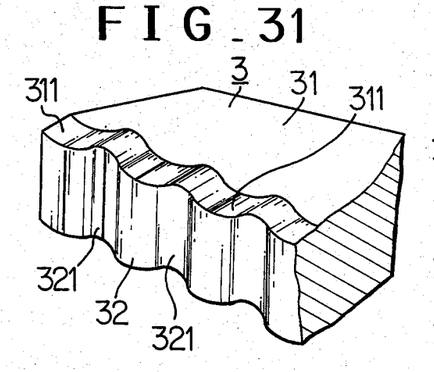
Figure 32:
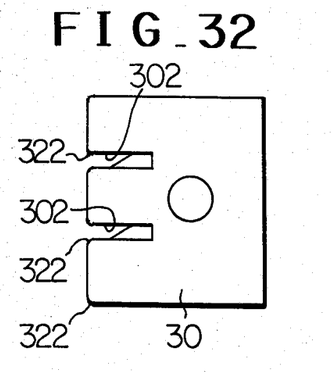
FIG. 32 is a plan view showing another embodiment, and FIGS. 33-A to 33-E are perspective views showing fibers of different shapes.

When the usage requires other shapes than the linear shape, it is sufficient to employ such tools having linear concave-convex on the rake face of the cutting edge or the flank face or both as shown in FIGS. 29 to 32. FIG. 29 is an instance forming grooves 311 on the rake face 31 at the set spaces. FIG. 30 is a case forming grooves 321 on the flank face 32. FIG. 31 is an example forming grooves 311, 321 on the both of the rake face 31 and the flank face 32. The above structures are applicable to the cutting tips. FIG. 32 is an application to the tool in FIG. 24 where R 322 is formed at corners of the rake face 31 with the slits 302.

Since the plastic deformation is, at production, imparted to parts to be sheared by the concave-convex of the cutting edge, the short fibers of different shape are obtained which is entirely or partially bent with the axial direction of the fiber.

Figure 33:
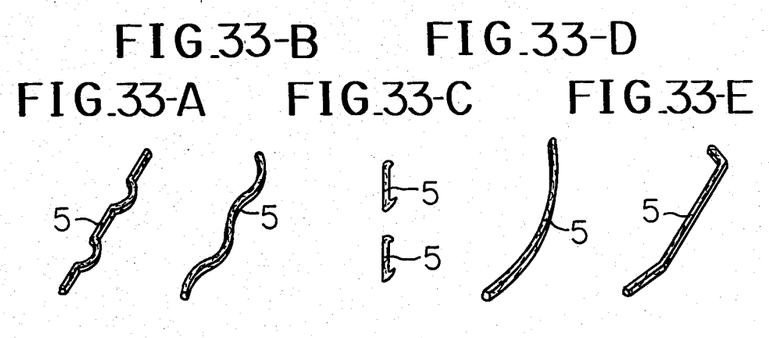

FIGS. 33-E show different shaped short fibers according to the present invention, and FIG. 33-A shows the fiber by the tools in FIGS. 29 and 30, FIG. 33-B depends on the tool in FIG. 31 and FIG. 33-C is by that of FIG. 32. FIG. 33-D depends on the tool, the flank face of which is formed with concave. FIG. 33-E is by tool whose flank face is formed with a trapezoidal concave.

EXAMPLE 1

(I)

Work material
  free cutting brass
  diameter: 100 mm
  length: 150 mm
Tool as shown in FIG. 10
  rake angle: $-5°$
  cut entering (l): 5.5 mm
  cutting speed (V): 100 m/min
  feed (S): 0.002 mm/rev
Self excited vibration (fn): 2.6 KHz (II)

The very fine short fibers were exactly produced, the diameter: about 40 microns, and the length: 5.5 mm. When the feed (S) was set 0.008 mm/rev, the fiber was 50 microns in converted diameter. For comparison, the ordinary rigid tool was used under the same conditions but without the self excited vibration. The result was about 120 microns in thickness with connection with the adjacent fibers.

EXAMPLE 2

(I)

Work material
  circular bar of stainless steel
    diameter: 150 mm
    length: 150 mm
Tool as shown in FIG. 8
  rake angle: $-10°$
  cut entering (l): 10 mm
  feed (S): 0.01 mm/rev
Self excited vibration (fn): 4.2 KHz (II)

The very fine short fibers were exactly produced, the diameter: 50 microns, and the length: 10 mm. For comparison, the ordinary rigid tool was used, and the result was only the fiber having connection in the length direction with the adjacent one and wave like furrows.

EXAMPLE 3

(I)

12 work materials: diameter of 60 mm and length of 150 mm: (1) 4-6 brass, (2) 7-3 brass, (3) cast bronze (BC6C) (4) cast bronze (BC6C), (5) pure Cu, (6) Al-alloy (A5056), (7) phosphor bronze (PBP2), (8) German silver, (9) S45C, (10) SS41, (11) S-free cutting steel (SUM22), (12) SUS303
Tool: the elastic cutting tool as shown in FIG. 11
  natural vibration: 1.9 KHz
  rake angle: $-5°$, cemented carbide tip (nose radius: 0)
  depth of cut: 5 mm
Self excited vibration (fn): 2.2 KHz (II)

The conditions and the results are as in Table 1.

TABLE 1

| Materials | V (m/min) | S (mm/rev) | A | B | C |
|---|---|---|---|---|---|
| (1) | 86 | 0.0059 | 5 | 70 | x |
| (2) | 86 | 0.0059 | 5 | 70 | x |
| (3) | 86 | 0.0040 | 5 | 58 | x |
| (4) | 42 | 0.0009 | 5 | 22.5 | x |
| (5) | 86 | 0.0036 | 5 | 55 | o |
| (6) | 86 | 0.0036 | 5 | 55 | o |
| (7) | 86 | 0.0036 | 5 | 55 | x |
| (8) | 38 | 0.0036 | 5 | 36 | x |
| (9) | 75 | 0.0036 | 5 | 51 | o |
| (10) | 75 | 0.0036 | 5 | 51 | o |
| (11) | 75 | 0.0036 | 5 | 51 | o |
| (12) | 75 | 0.0025 | 5 | 43 | o |

Notes:
A: Length (mm) of fiber
B: Diameter ($\phi$ $\mu$m)
C: Lubricant
x: No lubricant
o: water soluble cutting oil It will be seen from Table 1 that the present invention can produce the ultra thin and short metal fibers from many kinds of materials.

With respect to the tool life, the sufficient life may be obtained in German silver, P-bronze, brass and bronze even without lubricant, and it is secured in the high ductile property such as pure copper, Al-alloy and steel with the water soluble cutting oil only, since the oil penetrates on the surface of the cutting edge at the dislocation thereof and deposition is prevented.

(III)

The strength tests were carried out on the fibers from the work materials (2), (3) and (9). The results are as in Table 2, from which it will be seen that the fibers by the present invention have the sufficient strength.

TABLE 2

| Materials | Tensile strength (Kg/mm$^2$) |
|---|---|
| (2) | 25 |
| (3) | 36 |
| (9) | 70 |

EXAMPLE 4

Work material
  tight coil of cold-rolled soft steel
    diameter: 200$\phi$
    thickness: 0.5 mm
Tool as shown in FIG. 16
  rake angle: $-5°$, cemented carbide tip
  cutting angle ($\theta$): 30°
  cut entering (width of cut)(l): 10 mm
  cutting speed (V): 80 m/min
  feed (S): 0.0014 mm/rev
Self excited vibration (fn): 6 KHz The result was 20 pieces at once from the overall width of the cutting edge, and 6000 pieces per second, the diameter of about 20 $\mu$m, and the length of 0.55 mm.

We claim:

1. Process for producing short ultra-thin metal fibers having a cross-sectional dimension of less than 200 microns by directly cutting a metal block having a surface comprising the steps of:

(a) rotating said metal block such that said surface is moving at a cutting speed;

(b) contacting a cutting edge of an elastic tool to said surface at an entering cut, the cut having a width corresponding to a length of the fibers to be obtained, said elastic tool upon such contact self-generating self-excited vibrations;

(c) feeding said elastic tool towards said surface at a feed rate such that (1) said cutting edge is dislocated in a feed force direction, (2) the amplitude of said self-excited vibrations is larger that said feed rate, (3) said cutting edge separates from said surface once per cycle of each self-excited vibration, and (4) the cutting loci of the cutting edge contacting said surface are equal in n times and n+1 times of cutting, to finely cut, break, and separate said fibers from said surface;

(d) and wherein the rake angle of the cutting edge is between 0° and a negative angle; and in accordance with the material nature and thickness of fibers to be produced, the cutting speed is determined between 20 and 200 m/min, the feed rate between 0.001 and 0.02 mm/rev, and the self-excited vibration between 1 and 7 KHz, thereby producing a needle-shaped fiber in each cycle of said self-excited vibrations having said cross-sectional dimension and having a length corresponding to said entering cut, each said fiber having a smooth, bright face, a rugged face, and a destroyed face.

2. A process as claimed in claim 1, comprising contacting the tool onto the surface of a solid work metal, the tool having the cutting edge plurally divided in width, such that depth of cut is larger than length of fibers to be obtained.

3. A process as claimed in claim 1, comprising contacting the cutting edge to the solid work metal at said determined entering cut while continuously making slits to the opposite side of the work metal, spaces between the slits corresponding to the length of fibers to be obtained.

4. A process as claimed in claim 1, wherein the tool is straight in the rake face of the cutting edge for producing straight and short fibers.

5. A process as claimed in claim 1, wherein the tool has curved or linear concaves and convexes on the rake face of the cutting edge or the relief face thereof or both, and giving elastic deformations due to said concaves and convexes by the self-excited vibration for producing short fiber, entire bodies or parts of which are curved in direction right angled to the axial direction of the fiber.

* * * * *